Figure 1:
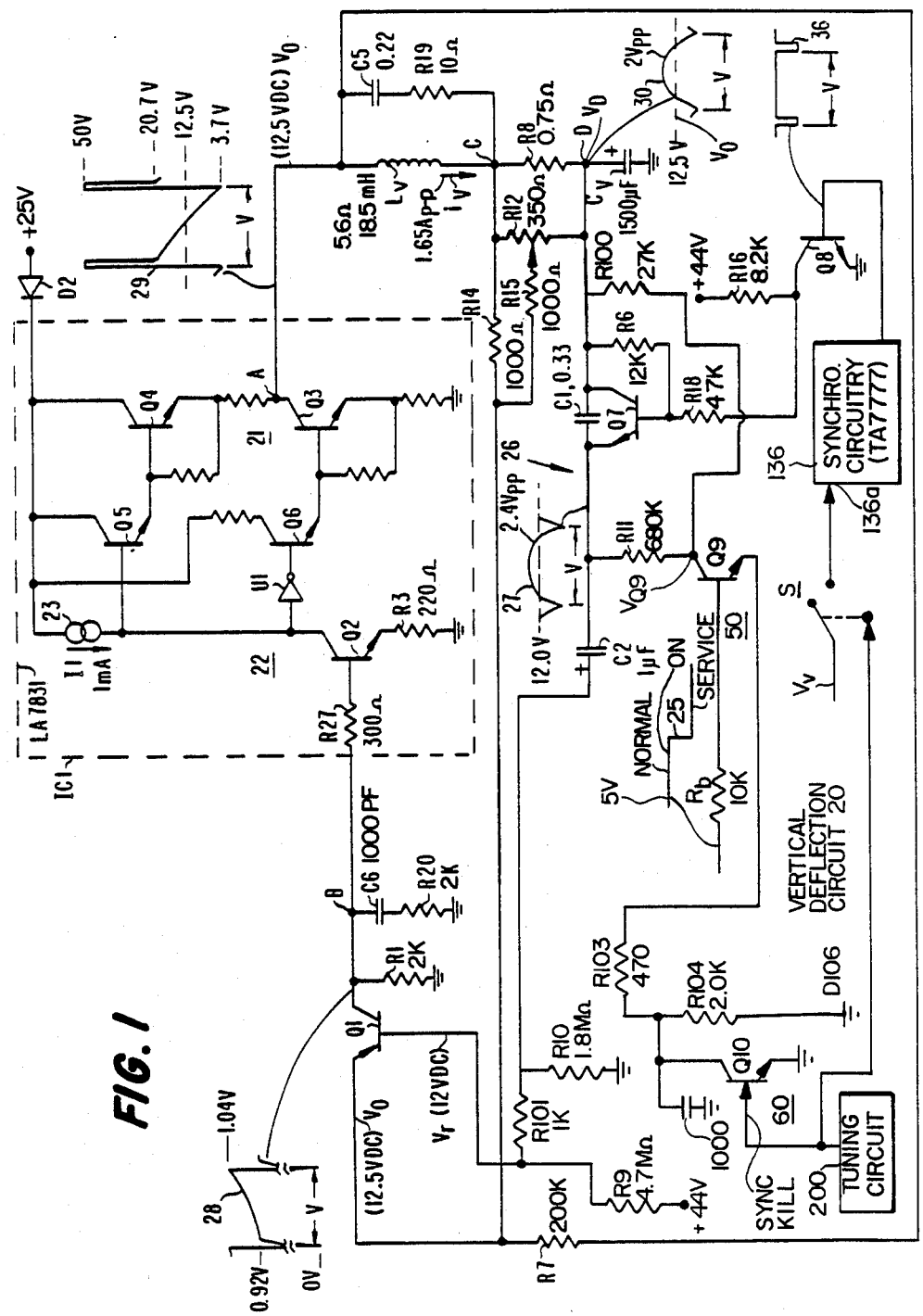

United States Patent [19]

Wilber

[11] Patent Number: 4,795,949

[45] Date of Patent: Jan. 3, 1989

[54] DEFLECTION CURRENT CORRECTION CIRCUIT

[75] Inventor: James A. Wilber, Indianapolis, Ind.

[73] Assignee: RCA Licensing Corporation, Princeton, N.J.

[21] Appl. No.: 179,371

[22] Filed: Apr. 8, 1988

[51] Int. Cl.$^4$ .................. H01J 29/70; H01J 29/76
[52] U.S. Cl. .................................................. 315/397
[58] Field of Search ................ 315/396, 397, 408; 358/159

[56] References Cited

U.S. PATENT DOCUMENTS

| | | |
|---|---|---|
| 4,272,777 | 6/1981 | Fitzgerald . |
| 4,365,270 | 12/1982 | Rutishauser . |
| 4,544,954 | 10/1985 | Chen . |
| 4,677,484 | 6/1987 | Pitsch et al. . |
| 4,694,226 | 9/1987 | Wilber . |
| 4,731,564 | 3/1988 | Pan et al. . |

FOREIGN PATENT DOCUMENTS 2023976 7/1979 United Kingdom .
2094114 9/1982 United Kingdom .

OTHER PUBLICATIONS

A technical manual, "The CTC 85 Color Chasis Technical Manual" dated 1977, pp. 35–44 and the deflection and power supply drawing.
A technical manual "RCA CTC 136 Color Television Basic Service Data" dated 1986, pp. 1-16 to 1-20, the cover sheet and a schematic draw. U.S. Application RCA Docket No. 84,905 entitled, Vertical Deflection Circuit with Service Mode Operation, in the name of J. A. Wilber, the same applicant as in the above captioned patent application and filed concurrently therewith.

Primary Examiner—Theodore M. Blum
Attorney, Agent, or Firm—Paul J. Rasmussen; Joseph J. Laks; Sammy S. Henig

[57] ABSTRACT

In a video display apparatus having an on-screen display feature (OSD), a vertical deflection circuit includes a vertical deflection winding coupled to a DC blocking capacitor. A deflection amplifier responsive to a sawtooth signal is coupled to the vertical deflection winding at an output terminal. A vertical sawtooth voltage generator that generates the sawtooth signal is coupled to an input terminal of the amplifier for driving the output stage at a vertical rate in a sawtooth manner to generate a sawtooth deflection current in the deflection winding. The sawtooth generator includes a capacitor that, during normal operation, is charged in a sawtooth manner via a resistor for developing a sawtooth signal. During a transition interval that follows a user initiated channel selection command, the frequency of the sawtooth signal becomes smaller. To prevent OSD character repositioning, a switch couples a first voltage via the resistor to the capacitor that causes the rate of change of the sawtooth signal and that of the deflection current to become smaller than during normal operation.

15 Claims, 2 Drawing Sheets

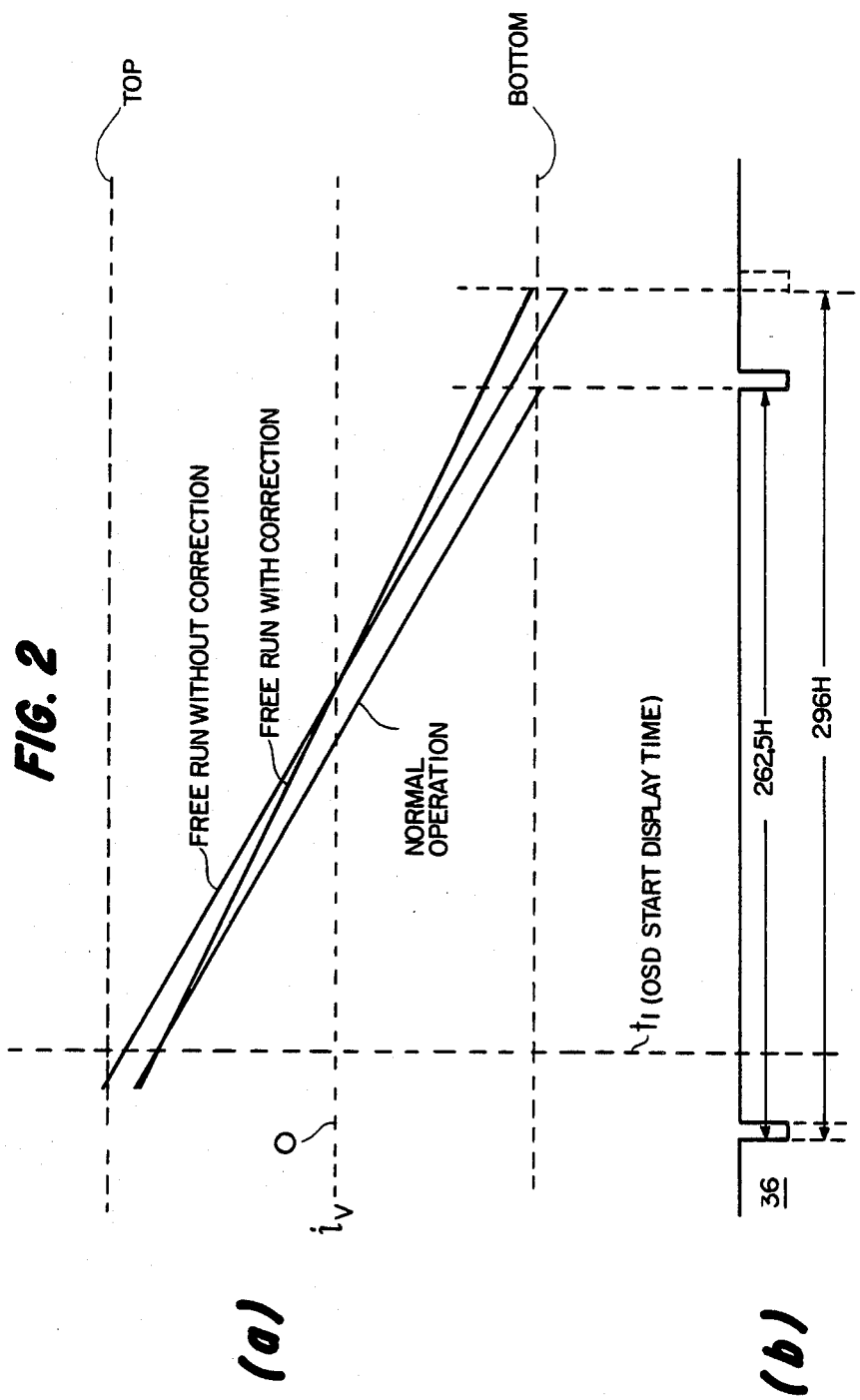

DEFLECTION CURRENT CORRECTION CIRCUIT

This invention relates to an arrangement of a television apparatus for varying a deflection current in response to control signal. The control signal may be generated, for example, when the deflection current is not synchronized to a synchronizing signal.

Typically, a control signal that is nominally at a vertical rate controls a vertical sawtooth signal generator of a vertical deflection circuit. The control signal determines the period of a deflection current in a vertical deflection winding that, in turn, determines the amplitude of the vertical deflection current.

In a television apparatus that utilizes a control signal generator such as, for example, an integrated circuit (IC) TA7777 made by Toshiba, Japan, (the Toshiba IC) for producing the control signal, the frequency of the control signal may be lower during free running, or unsynchronized operation of the vertical deflection circut than during normal operation. Free running operation occurs when a vertical synchronizing signal generator is decoupled from the control signal generator that generates the aforementioned control signal. The synchronizing signal is decoupled, for example, during an interval in which a new channel is selected for viewing by a television receiver user. The lower frequency of the control signal may cause the amplitude of the vertical deflection current, if not corrected, to be larger than during normal operation.

When an on-screen display feature (OSD) is utilized in the television receiver, the video information containing the characters to be displayed is applied to the corresponding guns of a cathode ray tube (CRT) of the receiver synchronously with the vertical control signal that was mentioned before. During, for example, channel change and/or during auto programming, the vertical synchronizing signal is decoupled from the control signal generator that causes the amplitude of the vertical deflection current to be larger. The synchronizing signal is decoupled from the control signal generator in order to reduce noise related disturbances during, for example, the channel selection interval. The increased amplitude of the deflection current, if not corrected, may result, disadvantageously, in the repositioning of OSD characters toward the top of the sceeen. Characters of the OSD near the top of the screen may be moved partially or completely off the CRT screen viewing area.

In accordance with an aspect of the invention, a second control circuit is provided that is responsive to a second control signal. The second control signal is indicative of the occurrence of intervals when the first control signal is at a lower frequency than during normal operation or unsynchronized to the vertical synchronizing signal. The second control signal causes a reduction in the amplitude of a sawtooth signal that is produced in the sawtooth signal generator. Therefore, the rate of change of the vertical deflection current is reduced for maintaining its amplitude closer to that during normal operation. Consequently, when the OSD characters are displayed, the vertical deflection current, even though it is at a lower frequency than in normal operation, is at a level that is close to that obtained during normal operation. The result is that the OSD characters are displayed close to their normal operation positions.

In accordance with another aspect of the invention, an arrangement responsive to a control signal generates a deflection current in a deflection winding. When the deflection current is synchronized to a synchronizing input signal the control signal is at a first state. When the deflection current is free running, the control signal is at a second state. The control signal causes the amplitude of the deflection current to be substantially the same when it is synchronized and when it is free running.

FIG. 1 illustrates a vertical deflection circuit with vertical current correction arrangement, embodying an aspect of the invention; and FIGS. 2a and 2b illustrate waveforms useful in explaining the operation of the circuit of FIG. 1.

In the illustrated vertical deflection circuit 20 of FIG. 1 for a television receiver or a video display apparatus, a vertical deflection winding $L_V$ is coupled to a vertical amplifier output stage 21 at an output terminal A. A current sampling resistor R8 is coupled to deflection winding $L_V$ at a terminal C, and a DC blocking and S-shaping capacitor $C_V$ is coupled to resistor R8 at a terminal D.

Vertical output stage 21 includes a top amplifier transistor Q4 coupled to a +25V DC supply via a diode D2 and a bottom amplifier transistor Q3 coupled to a ground reference potential point. A driver stage 22 is coupled to output stage 21 for driving the output stage at a vertical rate in a sawtooth manner to generate a sawtooth vertical deflection current $i_V$ in vertical deflection winding $L_V$.

Driver stage 22 includes an inverting amplifier, driver transistor Q2, and a current source 23 coupled to the collector of the transistor. Driver transistor Q2 drives top output transistor Q4 via a noninverting buffer transistor Q5 and drives bottom output transistor Q3 via an inverting stage U1 and a noninverting buffer transistor Q6. The driver and output stages may be incorporated into an integrated circuit, IC 1, such as the LA7831, manufactured by Sanyo Corporation.

To generate a vertical sawtooth crrrent $i_V$ in vertical deflection winding $L_V$, a vertical ramp generator 26 generates a downwardly going vertical ramp voltage 27 that is AC coupled by a capacitor C2 to the base of an error amplifier transistor Q1. Error amplifier transistor Q1 inverts vertical ramp voltage 27 to develop a vertical input voltage 28 across a collector load resistor R1 of transistor Q1. Input voltage 28 is applied to an input terminal B of driver stage 22 that is coupled to the base of inverting amplifier transistor Q2 via a resistor R2.

Vertical input voltage 28 progressively increases the conduction of driver transistor 22 during the vertical trace interval, progressively shunting more of current I1, developed by current source 23, away from top output amplifier portion Q5 and Q4. During the first half of trace, output transistor Q4 is conducting, to couple the +25V supply to vertical deflection winding $L_V$ via diode D2. A decreasing vertical deflection current $i_V$ flows in deflection winding $L_V$ and charges DC blocking capacitor $C_V$ from the +25V supply via transistor Q4.

During the second half of vertical trace, driver transistor Q2 has been made sufficiently conductive by input voltage 28 to turn off top output transistor Q4 an turn on bottom output transistor Q3. DC blocking capacitor $C_V$ discharges to ground via vertical deflection winding $L_V$ and transistor Q3, thereby generating the negative sawtooth portion of vertical deflection current $i_V$.

To initiate the vertical retrace interval, input voltage 28 turns off driver transistor Q2, thereby turning off bottom output transistor Q3 and turning on top output transistor Q4. Conventional vertical retrace circuitry, not illustrated in the FIGURES provides for the retrace of vertical deflection current $i_V$.

The operation of output stage 21 in response to vertical input voltage 28, develops a vertical output voltage 29 at output terminal A that is applied to vertical deflection winding $L_V$. The DC level, $V_0$, established at output terminal A, also establishes the same DC level at terminals C and D. Vertical deflection current $i_V$ generates an AC sawtooth voltage between terminals C and D, across sampling resistor R8, and generates a parabolic component 30 to the voltage $V_D$ developed across DC blocking capacitor $C_V$.

A DC negative feedback loop from output terminal A to input terminal B stabilizes the average DC operating voltage level at terminal A. The voltage at terminal A is coupled via terminal C to the emitter of error amplifier transistor Q1 to establish the DC voltage of the emitter at voltage level $V_0$. Voltage level $V_0$ is compared with a reference voltage level $V_r$ that is developed at the base of transistor Q1 by voltage dividing resistors R9, R101 and R10. The level of input voltage 28 is controlled by the conduction of transistor Q1 for stabilizing the DC voltage level $V_0$ at an operating level that is approximately $1V_{be}$ above reference voltage level $V_r$.

AC negative feedback for scan linearization is provided by coupling the AC sawtooth voltage developed across sampling resistor R8 to the emitter of error transistor Q1 via a voltage dividing network comprising potentiometer R12 and resistors R14 and R15. The AC sawtooth voltage at the emitter of error transistor Q1 is compared against reference ramp voltage 27 that is AC coupled to the base of the transistor in order to develop the AC component of input voltage 28. Deflection current amplitude is adjusted by adjusting the wiper arm of potentiometer R12.

Ramp generator 26, that develops AC reference ramp generating voltage 27, comprises an RC integrating network, capacitor C1 and a resistor R11. During normal operation, resistor R11 has a terminal that is coupled to ground via a series arrangement of a transistor Q9, that is conductive during normal operation, a resistor R103 and a transistor Q10, that is also conductive during normal operation. A reset switch, transistor Q7, is coupled across capacitor C1. Voltage $V_D$ developed across DC blocking capacitor $C_V$ is applied to the integrating network of capacitor C1 and resistor R11. The DC component of voltage $V_D$ is integrated by capacitor C1 to generate a downwardly-going ramp of voltage across resistor R11. The AC, parabolic component of voltage $V_D$ is integrated by capacitor C1 to provide S-shaping of the ramp voltage across resistor R11.

To initiate vertical retrace, ramp capacitor C1 is discharged by making reset transistor Q7 conductive. A vertical reset pulse 36, generated by a vertical synchronization circuitry 136 such as, for example, the aforementioned Toshiba IC, is applied to the base of a transistor Q8, making the transistor nonconductive during the short reset pulse interval. The collector of transistor Q8 is coupled to a +44V supply by a resistor R16. The collector of transistor Q8 is DC coupled to the base of reset transistor Q7 via a resistor R18. Negative going reset pulse 36 is inverted by transistor Q8 and applied to the base of transistor Q7, to turn transistor Q7 on and discharge capacitor C1. The sharp increase in ramp voltage 27 when capacitor C1 is discharged is coupled to the base of error amplifier transistor Q1 and turns the transistor off to initiate the vertical retrace interval.

A capacitor C5 in series with a resistor R19 across deflection winding $L_V$ damps deflection winding resonances. A resistor R7 is coupled between output terminal A and the emitter of error amplifier transistor Q1 to compensate for horizontal rate pickup by vertical deflection winding $L_V$. A capacitor C6 in series with a resistor R20 is coupled between input terminal B and ground to roll off the gain at higher frequencies to prevent deflection circuit high frequency oscillation.

During service mode operation of the television receiver used, for example, when color temperature is to be manually adjusted, or when degaussing is required, the raster is collapsed vertically by disabling vertical deflection circuit 20. Accordingly, a service mode switching circuit 50 disables the generation of vertical deflection current when the service mode of operation is asserted. Service mode switching circuit 50 includes service mode switching transistor Q9 having its collector coupled to an end terminal of resistor R11 that is remote from the junction between capacitors C2 and C1. A resistor R100 is coupled between terminal D of capacitor $C_V$ and the collector of transistor Q9. The emitter of transistor Q9 is coupled to ground.

During the normal mode of television receiver operation, a mode-switching signal 25, that may be conventionally generated, is in the high state, maintaining transistor Q9 in saturated conduction. Therefore, ramp generator 26 operates in the manner described before.

To assert the service mode of television receiver operation, mode-switching signal 25 is switched to the low state to cutoff conduction in transistor Q9. With transistor Q9 cutoff, the current path via resistor R11 for charging capacitor C1 is opened. Therefore, capacitor C1 can no longer be charged and the plate of capacitor C2 that is coupled to capacitor C1 will be at the level of voltage $V_D$. Consequently, generation of ramp voltage 27 ceases. Resistor R100 prevents leakage current from charging capacitor C1.

Due to the DC negative feedback provided by resistors R14, R15 and R12, the DC voltage at each of terminals A, C and D will be maintained at approximately +12.5 volts, that is approximately equal to reference voltage level $V_r$ plus one $V_{be}$ voltage of transistor Q1. Therefore, capacitor $C_V$ will be maintained charged to approximately +12.5 volts during service mode of operation. Consequently, when normal mode of operation is resumed, the transient supply current via diode D2 is, advantageously, smaller than if capacitor $C_V$ were not already charged.

An AC feedback loop path between the input and output of IC 1 includes capacitor C1 in parallel with switching transistor Q7. Because transistor switch Q7 operates during both the normal and service modes of operation, the frequency response characteristic of the AC feedback loop is substantially the same in both modes of operations. Therefore, advantageously, the frequency response characteristic, once optimized for normal mode of operation is unlikely to cause instability in the AC feedback loop during the service mode of operation.

When a user initiates a channel selection change command to a tuning circuit 200, a conventionally build OSD character generator, not illustrated, is activated to generate channel number display at top of screen. Simultaneously, a control signal SYNC KILL is generated by turning circuit 200 that causes a switch S to decouple a vertical synchronizing signal $V_V$ from a synchronizing signal receiving terminal 136a of synchronizing circuitry 136. Decoupling signal $V_V$ is desirable since signal $V_V$, during a transition interval when the channel is changed might contain noise that might adversely affect the deflection currents. Consequently, free running operation occurs in circuitry 136 that causes the frequency of signal 36 to become lower.

FIGS. 2a and 2b illustrate waveforms useful for explaining the operation of the circuit of FIG. 1. Similar symbols and numerals in FIGS. 1, 2a and 2b indicate similar items or functions. As shown by the dash line in FIG. 2b, the interval between successive pulses of signal 36 is equal to, for example, 296H where H is the horizontal period. In contrast, such interval is equal to 262.5H, in normal operation. Therefore, the amplitude of deflection current $i_v$ of FIG. 1 having a trace portion that is shown in FIG. 2a may become larger, if not corrected. Without correction, the level of vertical deflection current $i_V$ at time t1 that occurs when OSD characters begin to be displayed would be larger than during normal operation. Therefore, the OSD characters that are to be displayed in the vicinity of the top of the screen would move to the top of the screen or even completely off the screen.

In accordance with an aspect of the invention, signal SYNC KILL is coupled to the base of transistor Q10 of a correction circuit 60. Signal SYNC KILL causes transistor Q10 to become nonconductive when free running operation occurs in circuitry 136. Consequently, a resistor R104 of correction circuit 60 is interposed between resistor R103 and gruund. The result is that a voltage $V_{Q9}$ at the collector of transistor Q9 increases from, for example, +0.4 volts, occurring during normal operation, to +2.13 volts, occurring when signal SYNC KILL is generated. The increase in voltage $V_{Q9}$ is determined by the aforementioned resistors that form a voltage divider with a resistor $R_b$. Resistor $R_b$ couples through such voltage divider signal 25 that is at approximately 5 volts to the base of transistor Q9. Except during the previously described service mode operation, signal 25 is at approximately +5 volts.

The increase in voltage $V_{Q9}$ causes the rate of change of sawtooth signal 27 to decrease. Consequently, the increase in amplitude of deflection current $i_V$ due to the lower frequency of signal 36 is prevented. The result is that at time t1 of FIG. 2a, occurring when the OSD characters begin to be displayed, deflection current $i_V$ is at a level close to that during normal operation. Therefore, advantageously, the positioning of the OSD characters remains substantially the same as in normal operation even though the deflection current frequency is lower.

What is claimed:

1. A vertical deflection circuit of a video display apparatus, comprising:
    a vertical deflection winding;
    an amplifier responsive to a sawtooth signal, having trace and retrace portions in a given period thereof, and coupled to said deflection winding for generating a deflection current in said deflection winding at an amplitude that is determined in accordance with an amplitude of said sawtooth signal;
    a source of a synchronizing input signal at a frequency that is related to a vertical deflection frequency;
    a source of a first control signal;
    means responsive to said input signal and to said first control signal for generating a second control signal that is synchronized to said input signal when said first control signal is at a first state thereof and that is free running when said first control signal changes to a second state thereof; and
    a sawtooth signal generator responsive to said second control signal for generating said sawtooth signal that is synchronized to said second control signal, said sawtooth signal generator being responsive to said first control signal to vary the amplitude of said sawtooth signal in accordance with the state of said first control signal for preventing the frequency change of said second control signal from substantially changing the amplitude of said sawtooth signal, thereby preventing a substantial change in the amplitude of said deflection current.

2. A vertical deflection circuit of a video display apparatus comprising:
    a vertical deflection winding;
    an amplifier responsive to a sawtooth signal, having trace and retrace portions in a given period thereof, and coupled to said deflection winding for generating a deflection current in said deflection winding at an amplitude that is determined in accordance with an amplitude of said sawtooth signal;
    a source of a synchronizing input signal at a frequency that is related to a vertical deflection frequency;
    a source of a first control signal;
    means responsive to said input signal and to said first control signal for generating a second control signal that is synchronized to said input signal when said first control signal is at a first state thereof and that is free running when said first control signal changes to a second state thereof; and
    a sawtooth signal generator responsive to said second control signal for generating said sawtooth signal that is synchronized to said second control signal, said sawtooth signal generator being responsive to said first control signal to vary the amplitude of said sawtooth signal in accordance with the state of said first control signal for preventing the frequency change of said second control signal from substantially changing the amplitude of said sawtooth signal, thereby preventing a substantial change in the amplitude of said deflection current, said sawtooth signal generator including, a source of a first voltage, a first capacitance having a first terminal that is coupled to said source of said first voltage, a first switch responsive to said second control signal and coupled to said first capacitance, said first switch operating at a frequency that is related to that of said second control signal for discharging said first capacitance via said first switch to form said retrace portion of said sawtooth signal, and a controllable source of current responsive to said first control signal and coupled to a second terminal of said first capacitance for conducting a current that charges said first capacitance at a rate that is determined by the state of said first control signal such that a rate of change of said sawtooth signal during said trace portion thereof is determined in accordance with the state of said first control signal.

3. A vertical deflection circuit according to claim 2 further comprising, a second switch responsive to a third control signal that is indicative when service mode of operation is required and when normal operation mode is required for decoupling said controllable source of current from said first capacitance to prevent the generation of said sawtooth signal when said service mode operation is required.

4. An apparatus according to claim 3 wherein said controllable source of current comprises a first resistance coupled in series with said second switch that becomes nonconductive in said service mode of operation to prevent said first capacitance from charging via said first resistance.

5. An apparatus according to claim 4 further comprising, a second resistance having a first terminal that is coupled to said first terminal of said first capacitance and a second terminal that is coupled at a junction between said second switch and said first resistance.

6. An apparatus according to claim 4 further comprising, a second DC blocking capacitance having a first terminal that is coupled to a second terminal of said first capacitance and having a second terminal that is coupled to an input terminal of said amplifier.

7. An apparatus according to claim 2 further comprising, a deflection current sampling resistor coupled to said deflection winding and an error amplifier responsive to said sawtooth signal and to a signal that is developed across said sampling resistor for generating an error signal in accordance with a difference therebetween that is coupled to said input terminal of said amplifier.

8. An apparatus according to claim 2 wherein said source of said first voltage comprises a DC blocking capacitance that is DC coupled to an output terminal of said amplifier for developing said first voltage across said DC blocking capacitance.

9. An apparatus according to claim 2 wherein said first switch is coupled in parallel with said first capacitance for discharging said first capacitance during a portion of a given period of said second control signal.

10. An apparatus according to claim 2 wherein said controllable source of current comprises a first transistor having a collector electrode that is coupled to a second terminal of said first capacitance and having a base electrode that is responsive to a third control signal, said third control signal being at a first voltage level when a service mode operation is required and at a second voltage level when generation of said deflection current is required and a controllable impedance coupled to an emitter electrode of said first transistor and responsive to said first control signal for varying said impedance in accordance with the state of said first control signal.

11. A vertical deflection circuit according to claim 1 wherein said first control signal is generated by a tuning circuit during a tuning operation.

12. A deflection circuit according to claim 11 further comprising, switching means responsive to said first control signal for coupling said source of said synchronizing input signal to said second control signal generating means when said tuning circuit generates said first state of said first control signal and for decoupling said source of said synchronizing input signal when said tuning circuit generates said second state of said first control signal.

13. A vertical deflection circuit of a video display apparatus, comprising:
a vertical deflection winding;
a source of a first control signal;
a source of a synchronizing input signal at a frequency that is related to a vertical deflection frequency; and
deflection means coupled to said deflection winding and responsive to said input signal and to said first control signal for generating a deflection current in said deflection winding that is synchronized to said input signal when said first control signal is at a first state and that is free running at a different frequency when said first control signal is at a second state such that the amplitude of said deflection current is maintained substantially the same when said deflection current is synchronized and when said deflection current is free running.

14. A vertical deflection circuit according to claim 13 wherein said first control signal is generated by a tuning circuit during a tuning operation.

15. A deflection circuit according to claim 14 further comprising, switching means responsive to said first control signal for coupling said source of said synchronizing input signal to said deflection means when said tuning circuit generates said first state of said first control signal and for decoupling said source of said synchronizing input signal when said tuning circuit generates said second state of said first control signal.

* * * * *